United States Patent [19]

Dixon et al.

[11] Patent Number: 4,575,527
[45] Date of Patent: Mar. 11, 1986

[54] VISCOSITY STABILIZED WATER-SOLUBLE AMINE POLYMERS

[75] Inventors: Kenneth W. Dixon, Thornton; Steven M. Menchen, Rosemont, both of Pa.

[73] Assignee: Atlantic Richfield Company, Los Angeles, Calif.

[21] Appl. No.: 680,636

[22] Filed: Dec. 12, 1984

[51] Int. Cl.$^4$ .................................................. C08K 5/17
[52] U.S. Cl. ...................................... 524/253; 524/251; 524/257
[58] Field of Search ..................... 524/253, 257, 251

[56] References Cited

U.S. PATENT DOCUMENTS 3,048,555  8/1962  Traylor ................................. 524/257
3,988,277  10/1975  Witschonke ........................ 524/251

Primary Examiner—Paul R. Michl
Attorney, Agent, or Firm—C. R. Reap

[57] ABSTRACT

Aqueous solutions of water-soluble cationic amine polymers which are stable against viscosity changes are prepared by adding small amounts of amine compounds to the solutions and adjusting the pH of the solutions to a value in the range of about 10.5 to 12.5.

16 Claims, No Drawings

VISCOSITY STABILIZED WATER-SOLUBLE AMINE POLYMERS

FIELD OF THE INVENTION

This invention relates to water-soluble amine polymers and more particularly to the viscosity stabilization of concentrated aqueous solutions of amine polymers.

BACKGROUND

Water-soluble amine polymers are widely used to coagulate solids in the purification of aqueous liquids and to dewater oily wastes. For purposes of economy and functional effectiveness these polymers are prepared and shipped in the form of concentrated aqueous solutions. For example, aqueous solutions of amine polymers having weight concentrations of 40% and viscosities of about 10,000 centipoises (cps) are often prepared for industrial use. These concentrates may be used as is or, if accurate proportioning is desirable, they may be diluted with additional water. One of the drawbacks associated with concentrated aqueous solutions of polyamine polymers is that they have a propensity to increase in viscosity and form gels upon aging. Viscosity changes and gel formation are, of course, undesirable since it renders the polymer less effective and often unfit for use as a coagulating agent. Furthermore, it is very difficult to pump and accurately meter polymer solutions which have undergone viscosity changes or which have formed gels. Therefore, if aqueous polyamine solutions which are intended for use as coagulants are to be commercially successful they must exhibit stable viscosity characteristics at high concentrations.

PRIOR ART

Several techniques have been employed to retard gel formation in aqueous solutions of polyamine polymers. One means of preventing viscosity changes and gel formation in such solutions is to dilute the solutions to the point at which gel formation is insignificant during the useful life of the product. U.S. Pat. No. 3,131,144 teaches the preparation of condensation polymers made from halohydrins and polyamines in water at concentrations of 40% and subsequently reducing the concentration of the polymer to 20% by weight or less by the addition of water to produce solutions which are stable for relatively long periods of time. While this procedure may adequately serve the purposes of the end user it is obviously of little use to a manufacturer or shipper desiring to keep the polymer solutions as concentrated as possible. Another stabilization technique is to adjust the pH of the solution by the addition of acid to prevent further polymerization. U.S. Pat. No. 3,577,313 discloses the stabilization of aqueous solutions of polyalkylene polyamine-epichlorohydrin condensation products by adjusting the pH of the polymer solution to about 5 to 6 with an acid. This method is not always suitable since it renders the solution more corrosive. Other publications disclose the stabilization of aqueous polyamine-derived polymer solutions by chemical modification of the polymer. For instance, U.S. Pat. No. 3,240,761 discloses stabilizing aqueous polyamine-epichlorohydrin polymer solutions by reacting quaternizing agents with the polymer. U.S. Pat. No. 3,954,680 teaches the viscosity stabilization of polymers of secondary amines and epichlorohydrin which contain overdoses of ammonia cross-linking agent by reacting the polymer with a tertiary amine.

The present invention provides a convenient and efficient method of stabilizing solutions of polyamine-based polymers against viscosity changes while maintaining the polymer solution at pH values in the alkaline range. Accordingly, it is an object of the invention to present improved polyamine-based aqueous solutions. It is another object of the invention to present aqueous solutions of polyamine-derived polymers which are stable at high viscosities and high concentrations. It is another object of the invention to present aqueous solutions of polyamine-based polymers which are stable at pH values in the alkaline range. It is another object of the invention to present a new method of stabilizing concentrated aqueous solutions of polyamine-based polymers. It is another object of the invention to present a method of stabilizing alkaline aqueous solutions of polyamine epihalohydrin polymers. These and other objects of the invention are set forth in the following description and examples.

SUMMARY OF THE INVENTION

According to the invention, high viscosity aqueous solutions of amine-containing cationic polymers are stabilized against viscosity changes by adjusting the pH of the polymer solution to a value in the range of 10.5 to 12.5 and adding a reactive amine to the solution. In a preferred embodiment the pH of the polymer solution is adjusted to a value in the range of 11.0 to 12.0. In another preferred embodiment the reactive amine has 1 to about 10 carbon atoms. In a third preferred embodiment the reactive amine is added to the polymer solution at a concentration of about 0.1 to 5% based on the total weight of the solution.

DETAILED DESCRIPTION OF THE INVENTION

The aqueous polyamine solutions which can be viscosity stabilized by the present invention are the water soluble products prepared by the condensation of ammonia and/or polyfunctional amines with difunctional epoxy compounds or alkylene dihalides.

Typical polyfunctional amine compounds include simple primary or secondary amines or polyamine compounds. The simple amines, i.e. those containing only one nitrogen atom, may be straight- or branch-chained alkyl amines whose alkyl groups have 1 to 6 or more carbon atoms. In the case of dialkylamines the alkyl groups may be identical or different. The alkylamines may be substituted with oxygen or other hetero atoms, provided that the substituents do not prevent the amine from forming the desired water-soluble polymer. The most commonly used simple amines are the monoalkylamines and dialkylamines whose alkyl groups have 1 to 4 carbon atoms. Suitable simple amines include methylamine, ethylamine, dimethylamine, diethylamine, dihexylamine, bis(2-methylpropyl)amine, ethylmethylamine, methylbutylamine, hydroxypropylamine, dihydroxyethylamine, etc. Preferred simple amines include methylamine, ethylamine, dimethylamine, diethylamine, etc.

Polyamines useful in preparing the water-soluble amine polymers of the invention include linear or branched alkylenediamines having about 2 to 6 or more alkylene carbon atoms and polyaklylene polyamines having 2 or more nitrogen atoms and whose alkylene groups each have 2 to 6 or more carbon atoms. The polyamines may be unsubstituted or may be substituted with oxygen or other hetero atoms, provided that the substituent does not interfere with the formation of the desired water-soluble polymer. The most commonly used polyamines are the lower alkylene polyamines and polyalkylene polyamines wherein the alkylene groups contain 2 to 4 carbon atoms, such as ethylene diamine, propylendiamine, diethylenetriamine, etc.

The difunctional epoxy compound may be an epihalohydrin or a diepoxide or a precursor for either of these. Epihalohydrins which may be used include epichlorohydrin, epibromohydrin and epiiodohydrin. Diepoxides which are useable in the invention include ethylene glycol diglycidyl ether, 1,4-butanedioldiglycidyl ether, etc. Precursors of these groups of compounds include 1,3-dihalopropanol-2, such as 1,3-dichloropropanol-2, the precursor for epichlorohydrin, and 1,4-dichloro-2,3-dihydroxybutane, the precursor for 1,3butanediepoxide. The precursors are converted into the corresponding eiphalohydrin or diepoxide under alkaline conditions. The most commonly used epoxy compounds are epichlorohydrin and 1,4-butanediol-diglycidyl ether.

The alkylene dihalides which may be used include those having 2 to about 6 or more carbon atoms and any of the halogen substituents. Examples of such alkylene dihalides include ethylene dichloride, ethylene dibromide, proplyene dichloride, proplyene diiodide, hexylene dichloride, etc. The most commonly used alkylene dihalides are the lower alkylene dichlorides and dibromides, such as ethylene dichloride, ethylene dibromide, propylene dichloride, etc.

The water-soluble polymeric amine compounds are prepared by reacting the amine component or components with the epoxy or alkylene dihalide component, generally at ratios of 0.8 to 1.1 and more often at ratios of 0.9 to 1.05 equivalents of epoxy or halide component per equivalent of total amine.

The preparation of the water-soluble polymeric amine compounds that are stabilized herein forms no part of this invention. These compounds may be prepared by well known methods such as the procedures described in U.S. Pat. No. 3,131,144, U.S. Pat. No. Re. 28,807 and U.S. Pat. No. Re. 28,808, all of which are incorporated herein by reference.

Any primary, secondary or tertiary amine compound may be used to stabilize the water-soluble amine polymer compounds. The stabilizing amine may be monoamines or polyamines, i.e. amines containing two or more amine groups. It is preferable to use amines which are inexpensive and commonly available in commercial quantities. In general, amines containing from one to about 20 amine groups are preferred and the most preferred amines are those having from 1 to about 10 amine groups. The amines may be aliphatic or cyclic, including heterocyclic and the cyclic amines may be cycloaliphatic or aromatic. Amines which may be used as stabilizing amines include methylamine, dimethylamine, trimethylamine, ethylamine, diethylamine, tripropylamine, methylethylamine, methyldiethylamine, methylethylpropylamine, tripentylamine, ethylene diamine, diethylene triamine, triethylene tetramine, triethylene diamine, 1,5-diazabicyclo[4.3.0]non-5-ene(DBN), 1,8-diazabicyclo[5.4.0]undec-7-ene (DBU), piperidine, pyrrolidine, morpholine, piperazine, aminoethylpiperazine, guanidine, etc. Mixtures of amines may also be used as stabilizers. It is often convenient to use as the stabilizing amine the amine or mixture of amines from which the water-soluble polymer is made.

The amount of stabilizing amine required to effect a stabilized system will vary depending upon the particular water-soluble polymer being stabilized, the particular amine stabilizer or mixture of stabilizers used, the concentration of the polymer in the solution and the viscosity of the solution. Amounts varying from the minimum amount effective to provide a stable system up to about 5 percent or more, based on the total weight of the solution may be used. It is, of course, desirable to use as little as necessary to produce the desired result. In general, concentrations in the range of about 0.1% to 5%, based on the total weight of the solution, produce satisfactory results. Preferred amounts of stabilizer usually fall in the range of about 0.25 to 2%, based on the total weight of solution.

The stabilizers of the invention may be used alone or in combination with other stabilizers or other additives which it is desired to incorporate into the amine polymer solution.

The method of the invention is particularly advantageous for stabilizing aqueous solutions of cationic amine polymers having high viscosities and high active solids concentrations such as those having viscosities of about 1000 to 25000 cps and active solids contents of about 20% by weight or more.

The invention is effective for stabilizing previously prepared or freshly prepared water-soluble amine solutions. When previously prepared solutions are to be stabilized it is merely necessary to add the appropriate amount of stabilizing amine to the solution and adjust the pH of the solution. As noted above, the pH of the solution of the solution is adjusted to a value in the range of 10.5 to 12.5 and preferably 11.0 to 12.0. This can be accomplished by the addition of acids or bases, depending on the pH of the untreated solution. When basic reagents are used it is convenient to use alkali hydroxides, such as sodium hydroxide, potassium hydroxide or ammonium hydroxide. Strongly basic amines may also be used to raise the pH to the desired alkaline range. Common inorganic acids, such as sulfuric acid or hydrochloric acid can be conveniently used where appropriate to lower the pH of the solution.

In preparing fresh stabilized amine polymer solutions the following typical procedure can be used. To a concentrated solution of amine in water (about 40% by weight) epichlorohydrin is slowly added. Since the reaction is generally exothermic it may be desirable to cool the reaction mixture. Uoon completion of the addition of the epichlorohydrin the solution is aged at an elevated temperature, and the viscosity is increased to the desired value with additional epichlorohydrin. The solution is then quenched with base, treated with the amine stabilizer and the PH finally adjusted to the desired value.

The order of carrying out the pH adjustment and stabilizing amine addition steps is not critical. The amine can be added first followed by pH adjustment or the pH can be adjusted first and then the amine added. In some cases it may be desirable to partially adjust the pH, then add the amine stabilizer and then make a final pH adjustment. In most cases it is usually preferred to add the amine stabilizer first and then adjust the pH of the solution because the amine itself is alkaline and tends to affect the pH. When using strongly basic amines, such as triethylene diamine and DBN it may be unecessary to adjust the pH since these amines tend to adjust the pH to the desired alkaline range by themselves.

The following examples illustrate specific embodiments of the invention. Unless otherwise indicated parts and percentages are on a weight basis. In the examples the amine polymer was prepared from a mixture of ethyleneamines sold by Union Carbide Corporation under the trademark Amine HH.

EXAMPLE I

A water-soluble amine polymer solution was prepared as follows: Amine HH (120.0 gms) was dissolved in 200 gms of water. Next 100.5 gms of epichlorohydrin was added to the Amine HH solution over a period of 2.25 hours while maintaining the temperature of the solution at about 58° C. by means of cooling and agitation. The temperature of the reaction mixture was then raised to and maintained at 90° C. for 2.25 hours, after which an additional 5.3 ml of epichlorohydrin was added over a 2 hour period to increase the viscosity to 230 cps, measured at 90° C. The reaction mixture was aged at 90° C. for an additional hour upon which the viscosity of the solution reached 1200 cps, measured at 90° C. Next 74 gms of 50 weight percent solution of sodium hydroxide was added and the solids content was adjusted to 50 weight percent by the addition of 35 gms of water. Then 4.0 gms of Amine HH was added to the solution and the solution was cooled to room temperature. The concentration of Amine HH in the solution was 0.7%, based on the weight of the solution. The final solution had a pH of 12.3 and a viscosity (measured at 25° C.) of 7050 cps.

EXAMPLE II (Comparative)

A water-soluble amine polymer solution was prepared as follows: Amine HH (200.0 g) was dissolved in 390 g of water. Next 168.7 g of epichlorohydrin was added to the Amine HH solution over a period of 3 hours while maintaining the temperature of the solution at about 60° C. by means of cooling and agitation. The temperature of the reaction mixture was then raised to and maintained at 90° C. for 1 hour, after which an additional 6.4 ml of epichlorohydrin was added over a 2 hour period to raise the viscosity of the solution to 200 cps, measured at 90° C. The reaction mixture was aged at 90° C. for an additional 15 minutes, upon which the viscosity of the solution reached 700 cps, measured at 90° C. Next 95 g of 37 weight percent solution of hydrochloric acid was added, the solids content was adjusted to 50 weight percent by the addition of 50 g of water, and the solution was cooled to room temperature. The final polymer solution had a pH of 4.8 and 25° C. viscosity of 4,500 cps (Brookfield).

EXAMPLE III

Three samples of the product of EXAMPLE I were prepared. The pH of two of these samples was adjusted with concentrated hydrochloric acid to 9.7 and 11.1. These three samples and a sample of the product of EXAMPLE II were aged over a period of up to 40 days at 50° C. At various intervals the viscosity of these samples was measured at 25° C. The results are tabulated in the following table.

TABLE

| RUN | SAMPLE pH | BROOKFIELD VISCOSITY @ 25° C. cps. | | | | |
|---|---|---|---|---|---|---|
| | | 0 Days | 4 Days | 10 Days | 15 Days | 40 Days |
| 1 | 12.3 | 7050 | 6300 | 5700 | 5000 | 4500 |
| 2 | 11.1 | 5800 | 5600 | 5700 | 5600 | 5400 |
| 3 | 9.7 | 4100 | 5250 | 8200 | 16000 | >50000 |
| 4 | 4.8 | 4500 | >50000 | — | — | — |

This example illustrates the benefit of the invention. The test samples used in Runs 1, 2 and 3 were prepared from the Example I product. The Run 4 sample was from Example II. In Run 1 the viscosity was fairly stable over the entire 40 day period. The Run 2 sample exhibited very stable viscosity characteristics over the 40 day period. The viscosity of the Run 3 sample increased significantly over the 40 day period. These samples show that the pH of the stabilized sample is critical. The Run 4 sample viscosity increased markedly over a period of just 4 days. This run illustrates the instability of unstabilized water-soluble Amine HH polymer solutions even at low pH values.

EXAMPLE IV (Comparative)

A water-soluble amine polymer solution was prepared as follows: Amine HH (51.4 gms) was dissolved in 100.6 gms of water. Next, 43.7 gms of epichlorohydrin was added to the solution over a period of 3 hours. The solution was heated to and maintained at 90° C. for 2 hours. Then 1.45 mls of epichlorohydrin was added to the solution over a 2 hour period to increase the viscosity to 300 cps. The reaction mixture was aged at 90° C. for 1 hour whereupon the viscosity increased to 1100 cps. Next, 37.6 gms of 50 weight percent solution of sodium hydroxide and 17 gms of water were added to the solution to produce a product having a pH of 11.4 and a viscosity of 7000 cps. This sample was aged at 70° C. The viscosity (measured at 70° C.) increased to 15000 cps within 20 minutes. This example illustrates that water-soluble Amine HH-epichlorohydrin polymers are unstable at alkaline range pH values.

Although the invention is illustrated with specific examples it is understood that the invention includes variations of the examples. The scope of the invention is limited only by the breadth of the appended claims.

What we claim is:

1. A visocity-stable aqueous polymer solution suitable for use as a flocculating agent comprised of (a) a water-soluble cationic amine polymer which is the condensation reaction product of ammonia or a polyfunctional amine and a difunctional epoxy compound or an alkylene dihalide and (b) a stabilizer containing 1 to about 20 amine groups, said solution having a pH in the range of about 10.5 to 12.5 and said stabilizer being present in an amount sufficient to stabilize said solution against viscosity changes.

2. The solution of claim 1 wherein the stabilizer is present in an amount of about 0.1 to about 5%, based on the total weight of the solution.

3. The solution of claim 2 wherever the stablizer is an aliphatic or cycloaliphatic amine containing 1 to 10 amine groups.

4. The solution claim 3 wherein said stablizer is selected from linear polyamines containing up to 6 amine groups, cyclic polyamines containing up to 6 amine groups, and mixtures of these.

5. The solution of claim 4 wherein said stabilizer is comprised predominantly of aminoethylpiperazine and triethylenetetramine.

6. The solution of claim 1 having a viscosity measured at 25° C. of about 1000 to 25000 cps and an active solids concentration of at least about 20%.

7. The solution of any one of claims 1, 2, 3, 4, 5, or 6 having a pH in the range of 11.0 to 12.0.

8. The solution of claim 7 wherein said stabilizer is present at a concentration of 0.25% to 2%, based on the total weight of the solution.

9. A method of stabilizing the viscosity of an aqueous solution of a water-soluble cationic amine polymer which is the condensation reaction product of ammonia or a polyfunctional amine and a difunctional epoxy compound or an alkylene dihalide comprising.

(a) adding to said solution a stabilizing amine having 1 to about 20 amine groups in an amount sufficient to prevent substantial changes in viscosity, and (b) adjusting the pH of the aqueous solution to a value in the range of about 10.5 to 12.5.

10. The method of claim 9 wherein the stabilizer is added to the solution in an amount of about 0.1 to 5%, based on the total weight of the solution.

11. The method of claim 10 wherein the stabilizer is an aliphatic or cycloaliphatic amine containing 1 to 10 amine groups.

12. The method of claim 10 wherein said stabilizer is selected from linear alkylene polyamines having up to 6 amine groups, cyclic polymines having up to 6 amine groups and mixtures of these.

13. The method of claim 12 wherein said stabilizer is comprised predominately of aminoethylpiperazine and triethylenetetramine.

14. The method of claim 9 wherein said aqueous solution has a viscosity measured at 25° C. of about 1000 to 25,000 cps and an active solids concentration of at least about 20%.

15. The method of any one of claims 8, 9, 10, 11 or 12 having a pH in the range of about 11.0 to 12.0.

16. The method of claim 12 wherein said stabilizer is added to said solution at a concentration of about 0.25 to 2%, based on the total weight of the solution.

* * * * *

UNITED STATES PATENT AND TRADEMARK OFFICE
CERTIFICATE OF CORRECTION

PATENT NO. : 4,575,527

DATED : March 11, 1986

INVENTOR(S) : Kenneth W. Dixon and Steven M. Menchen

It is certified that error appears in the above-identified patent and that said Letters Patent is hereby corrected as shown below:

Claim 4, Column 6, Line 65     Insert --of-- before claim

Claim 4, Column 6, Line 66     Insert --alkylene-- before polyamines

Signed and Sealed this

Seventeenth Day of June 1986

[SEAL]

Attest:

DONALD J. QUIGG

Attesting Officer     Commissioner of Patents and Trademarks